(12) United States Patent  
Schütt

(10) Patent No.: US 6,390,531 B1  
(45) Date of Patent: May 21, 2002

(54) FOLDING ROOF FOR A CONVERTIBLE

(75) Inventor: Thomas Schütt, Fürstenfeldbruck (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/656,490

(22) Filed: Sep. 6, 2000

(30) Foreign Application Priority Data

Sep. 6, 1999 (DE) .......................................... 199 42 428

(51) Int. Cl.$^7$ .................................................. B60J 7/12

(52) U.S. Cl. ........................... 296/107.13; 296/107.15; 296/116

(58) Field of Search ................. 296/107.13, 107.15, 296/107.09, 116

(56) References Cited

U.S. PATENT DOCUMENTS 5,810,422 A * 9/1998 Corder et al. ............... 296/116

* cited by examiner

*Primary Examiner*—Dennis H. Pedder  
*Assistant Examiner*—Patricia Engle  
(74) *Attorney, Agent, or Firm*—Nixon Peabody LLP; David S. Safran

(57) ABSTRACT

A folding roof (1) for a convertible with a canvas top (2) which is attached to a front bow (3) and which can be moved into a rear lowered position with a top mechanism which comprises a side roof rod (11, 12) for opening the folding roof (1), the front bow (3) being guided to be able to move lengthwise on both side of the roof on guides (9, 10) of the side roof rod (11, 12), so that by moving the front bow (3) rearward along the lateral guides (9, 10) from a closed position in which it adjoins the front cross member (4), the folding roof (1) can be partially opened into an intermediate position.

25 Claims, 21 Drawing Sheets

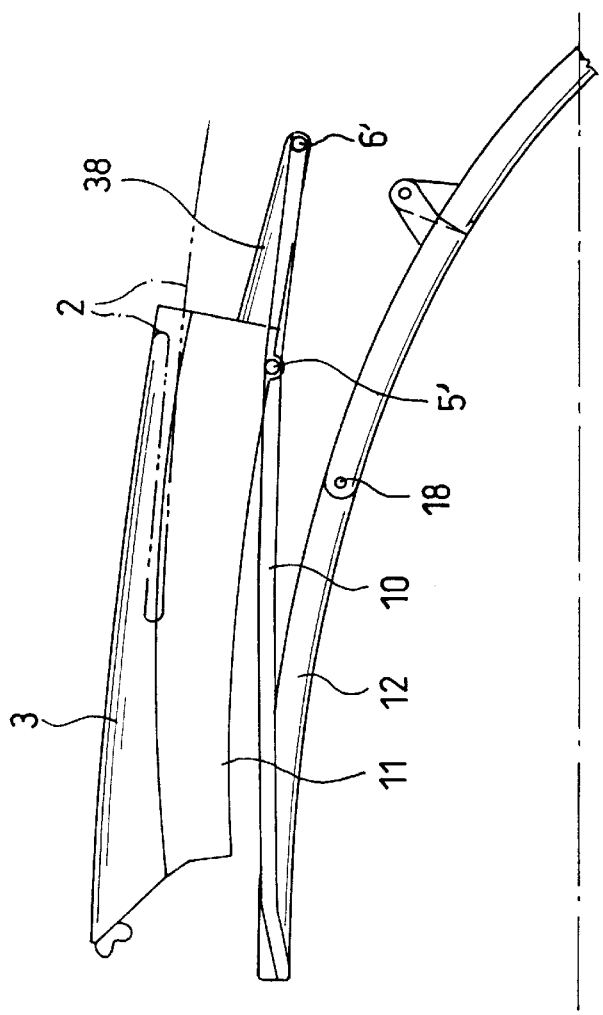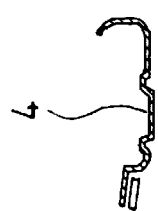
FIG. 11

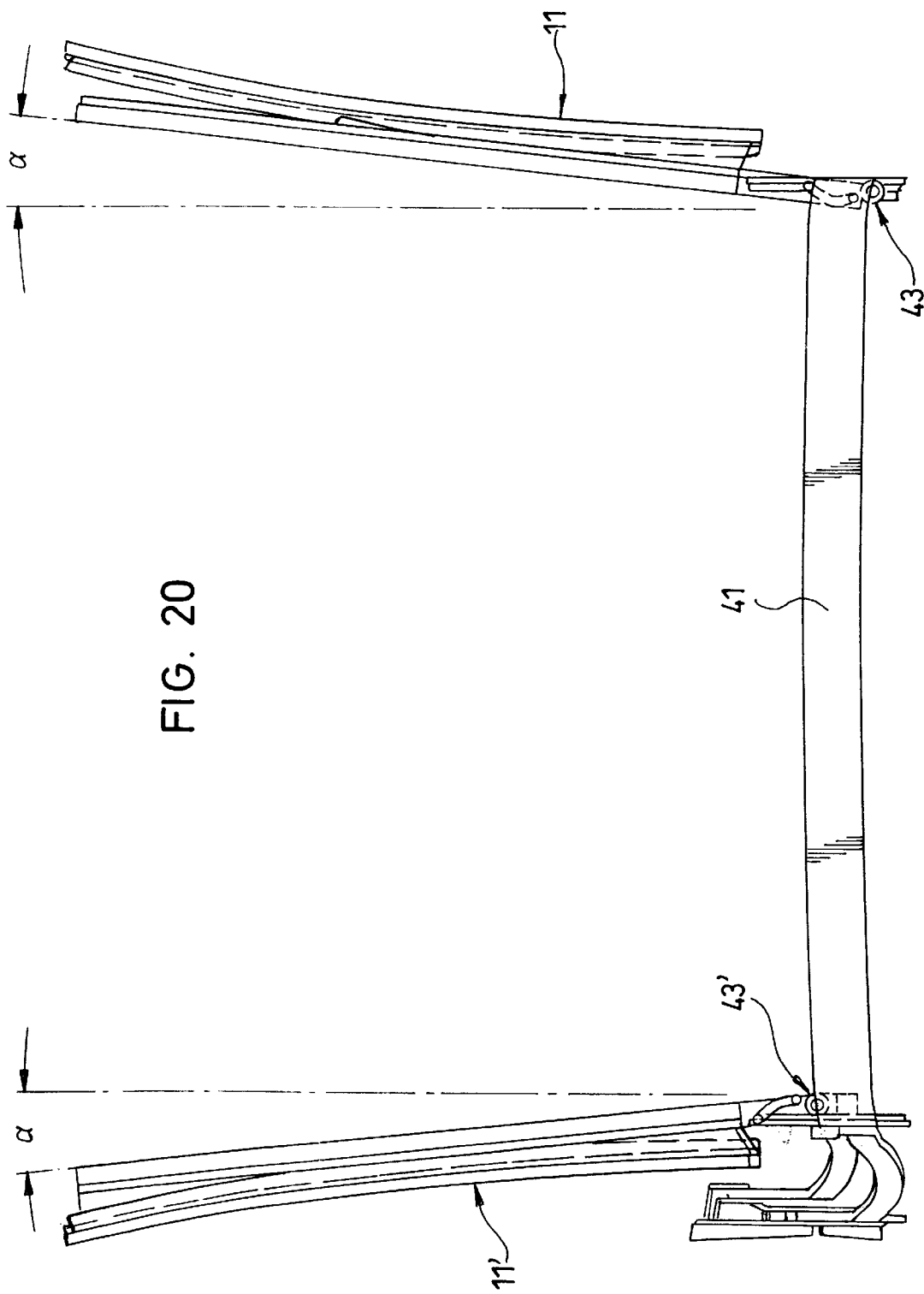

FOLDING ROOF FOR A CONVERTIBLE

BACKGROUND OF THE INVENTION

1. Field of the Invention

The invention relates to a folding roof for a convertible with a canvas top which is attached to a front bow and which can be moved into a rear lowered position with a top mechanism which comprises a side roof rod for opening the folding roof.

2. Description of Related Art

To lower one such conventional folding roof system, ordinarily, the first top part is folded to the rear via joints in the side roof rods and is placed on a second top part. However, the arches of the two top parts are pointed oppositely, and thus, a large lowering height results. In addition, in this type of folding of the top, the inside of the first top part faces upward and could become dirty, so that it is not suitable as a cover of the storage space.

Published International Application WO 97/37866 discloses a kinematic folding roof for a convertible in which a front top part of a three-part frame of the top is moved out of the closed position into the storage position by swivelling parallel via a parallelogram rod arrangement which connects the side roof rods of the front cover part to those of the middle part of the top. In the storage position, the front part of the top is identically cambered, i.e., lies on the middle part of the top with an identically pointed arch. The motion of parallel swivelling of the first part of the top is forcibly coupled via a control lever to the lowering motion of the rear part of the top.

SUMMARY OF THE INVENTION

A primary object of the present invention is to devise a folding roof of the initially mentioned type which can be housed in a space-saving manner in the storage space, and in particular, can be moved into a partially open position when driving.

This object is achieved in accordance with the invention by the front bow of the folding roof being guided to move in the lengthwise direction of the roof on both sides on guides of the side roof rod so that, by moving the front bow rearwards along the lateral guides from its closed position in which it adjoins the front cross member, the folding roof can be partially opened into an intermediate position. By moving the front bow, which can also be done when driving, the folding roof can be partially opened for ventilation of the interior. The side roof rods or side members of the frame of the top can thus remain locked in their position on the front cross member and thus maintain the stability of the frame of the top. While by moving the front bow rearwards, the canvas folding roof is placed in the front area of the top, for example, in a Z-shaped fold, the canvas folding roof remains in the rear area of the top, for example, tensioned in its shape by the main bow which cannot be moved on the frame of the folding roof, and on which, the canvas folding roof is fixed, as far as a rear attachment of the canvas folding roof on the equator of the body. By moving the front bow, which conventionally has an arch or a camber, over the section of the folding roof which is likewise cambered and which lies behind it, an equally cambered arrangement results which yields a reduced space requirement when the folding roof is lowered in the storage space. Various intermediate positions of the front bow as far as a defined, maximally opened intermediate position can be set. Of course, the explanations also apply to the opposite sequence of motions when the folding roof is being moved out of the storage space and closed again, and also intermediate positions can be adjusted from this direction of motion. In the closed position, the front bow lies on the cross member on the top edge of the front window of the vehicle or on a comparable vehicle-mounted component, such as the frame of the front window, a wind deflector or a connecting part between the top junctions of the two A columns.

For space-saving accommodation of the folding roof in a storage space, it is advantageous if the side roof rods or side members are each divided into a front and a rear roof rod which, in the closed position of the folding roof, form a top frame which is essentially rigid and which is coupled to the cross member, and in the storage position of the opened folding roof, are released from the rigid lengthwise coupling and accommodated in a compact arrangement. When the coupling is released, the roof rods can be swung around, in, or out in different ways and can be located in different positions which require less space, especially in the lengthwise direction of the vehicle. The rear roof rod can be a fixed lateral part of a roof cassette which contains the main bow with the side parts which are attached on either side.

In one especially practical embodiment, the front bow contains the front roof rods, for example, as integrated components, and it is supported both in its closed position and also in the intermediate position only on the guides of the rear roof rod and can be moved jointly with the front roof rods into an intermediate position. When the top is opened into an intermediate position, thus, the front side roof rods are also unlocked from the cross member and are removed from it. The parts which hold the top frame are, in this case, designed with great stability. Since the front bow is not folded up or swung up, but is pushed barely over the canvas folding roof which lies behind, the area exposed to the wind is small, with the corresponding advantages for the stability of the top when it is partially opened even when driving.

The front bow can be movably supported in its closed position on the guides of the front roof rods and/or on the guides of the rear roof rods, by which different configurations for the support of the front bow can be accomplished.

In one preferred embodiment, when the front bow is displaced from its closed position into an intermediate position, the front roof rods are coupled to the cross member, ensuring high strength and stability of the frame of the top.

Preferably, the front bow is supported in a defined intermediate or end position on the guides of the rear roof rods or the roof cassette so that the front roof rods can be moved into an arrangement with a shortened length relative to the length of the cover to be folded. Here, it is feasible for the front and the rear roof rods to be pivotally joined to one another by a pivot joint, and to lower the folding roof into the down position, the front roof rods are pivoted, especially in or even slightly out. The pivoting motion of the front roof rods can take place in a roughly horizontal vehicle plane, roughly around a transverse axis of the vehicle or around axes which deviate therefrom.

The folding roof, between the front bow and the main bow, can have at least one middle bow which is guided on the guides and to which the canvas top is attached. When moved back into an intermediate position the front bow first moves with the formation of a Z-shaped fold of the canvas top against the middle bow which is fixed on the guide until it is positioned on or essentially over the middle bow. The canvas top remains tensioned in its shape by the middle bow via the main bow to the rear attachment of the canvas top on the equator of the vehicle body. The front bow and the middle bow can then be pushed back further to the main bow as an intercoupled unit. The drive of this bow unit takes place via the front bow, while the middle bow which does not have its own drive is entrained.

In an arrangement which is feasible for lowering the top, each of the rear roof rods or the side parts of the roof cassette are pivotally mounted on the body via a respective parallelogram-like four-bar arrangement which contains a main column and a main connecting rod. An electrical or hydraulic main drive acts, for example, on the main column, and moves the entire four-bar arrangement and thus the folding roof via the main column.

The front roof rods do not need their own drive if the four-bar arrangement is coupled via a connecting rod means to the front roof rod, and during its pivot motion to lower the cover into the lowered position, it swings in the front roof rod via this connecting rod means.

In one simple configuration, the connecting rod of the connecting rod means, on the one hand, is pivotally coupled to a projection of the main connecting rod which projects via its hinged connection to the rear roof rod, and on the other hand, is coupled to the front roof rod or to an auxiliary rod arrangement of the roof rod connected in between.

Another embodiment calls for the connecting rod means to be driven by the pivoting main column of the four-bar arrangement; however, the main connecting rod can also be used as the drive. Because the connecting rod means is coupled via a lock means to the main column over the defined pivot path of the main column in a driving engagement, it is possible to fix the initial pivot position and the end pivot position of the main column which determine the area in which the connecting rod means, as a pivot drive, is in an active driving connection when the folding roof is folded in or out. Instead of the main column, the lock means can also couple the connecting rod means to the main connecting rod according to one alternative embodiment.

An arrangement is especially preferred in which pivoting of the left and the right front roof rods is staggered in time by the connecting rod means. In this way, the two pivoting roof rods can be swung in one after the other from the left and the right top side into a cross position without mutual hindrance, for example, on or underneath the main bow or the roof cassette. The pivoting roof rods can thus have a greater length which, for example, corresponds roughly to the width of the folding roof.

Feasibly, the connecting rod means provides a varying drive speed for the front roof rod. Thus, for example, translation of the motion of the connecting rod means can be designed such that the pivoting speed of the roof rod is adjusted depending on the pivoting speed of the main column and is variable over the pivot path. Thus, at the start and at the end of the pivot motion, a comparatively slow speed can be set for lowering the roof rods on the roof cassette or for coupling to the front cross member, and in between, a higher speed can be used.

Preferably, the connecting rod means contains a ring which is pivotally mounted concentric to the pivot bearing axis of the main column and bordering the main column. This ring is drive-coupled via its lever arm and via intermediate rods and hinges of the connecting rod means to the roof rod.

Furthermore, the lock means can have a lock pin which is supported to be able to move axially in the ring, and depending on the pivot position of the main column relative to the roof cassette side part, is pushed into coupling engagement with the main column.

Stops, such as pins, projections and the like can be provided to limit a path of motion of the connecting rod means, especially the lever arm of the ring.

For a uniform and space-saving arrangement of the roof rods which are swung in crosswise, it is advantageous if the pivot joints of the roof rods, which have a vertical swivel axis and which are located on the two-sided roof cassette side parts, are offset relative to one another in the lengthwise direction of the vehicle, the amount of offset, for example, corresponding roughly to the thickness of the roof rods. Thus, also longer roof rods can be swung into the down position in a space-saving manner.

In one alternative embodiment, the front bow, as it continues to move backwards from a defined intermediate position, activates an auxiliary rod arrangement via which the front roof rods are pivoted or swung in. By means of this forced coupling, a separate drive is likewise unnecessary. However, there can also be an additional drive which pivots the front roof rods, and pivoting can take place independently of the position or movement of the front bow or other components of the folding roof.

The drive for the front bow is preferably located on the rear roof rod or the main bow and is connected to the front bow via a coupling such as, for example, cable pulls or Bowden cables. These arrangements of the drive allow a configuration of the roof headliner with minimum possible adverse effects on the head space for the vehicle passengers.

In one practical configuration, it is provided that one displacement motion of the front bow at a time out of an opened, defined intermediate position, locks or unlocks a lock means to fix the roof rods on the cross member. Thus, locking and unlocking of the frame of the top takes place on the cross member as long as the canvas top is untensioned in the front top area. While, in conventional folding roof systems, the last closing motion of the cover, at the same time, encompasses the tensioning of the entire canvas top and the actuation of the locking means, for which hydraulic force drives are necessary, in this configuration, more weakly dimensioned electric drives can execute the locking and tensioning of the front section of the canvas cover which take place after one another.

The front bow can be supported on the guides by means of the sliding elements or also by combinations of sliding and rolling elements.

When the guides have gradient sections, with a corresponding arrangement of these gradient sections, the front bow can be raised out of its closed position during opening and can be guided over the canvas top which lies behind.

The front roof rods can each be composed of two successive roof rod elements which are connected to one another by a joint. In this way, longer folding roofs can be lowered by repeated subdivisions of the side rods, likewise, in a compact arrangement.

In the described cover mechanism, the front bow can be made as a cover for a storage space of the top since its surface always faces up.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 10 to 13 are side elevational views in schematic form of a second embodiment of a folding roof showing different positions proceeding from a closed position in FIG. 10 to a completely open position in FIG. 13;

FIGS. 19 & 20 show two side roof rods in the normal and swung-out positions, respectively.

DETAILED DESCRIPTION OF THE INVENTION

Figure 1:
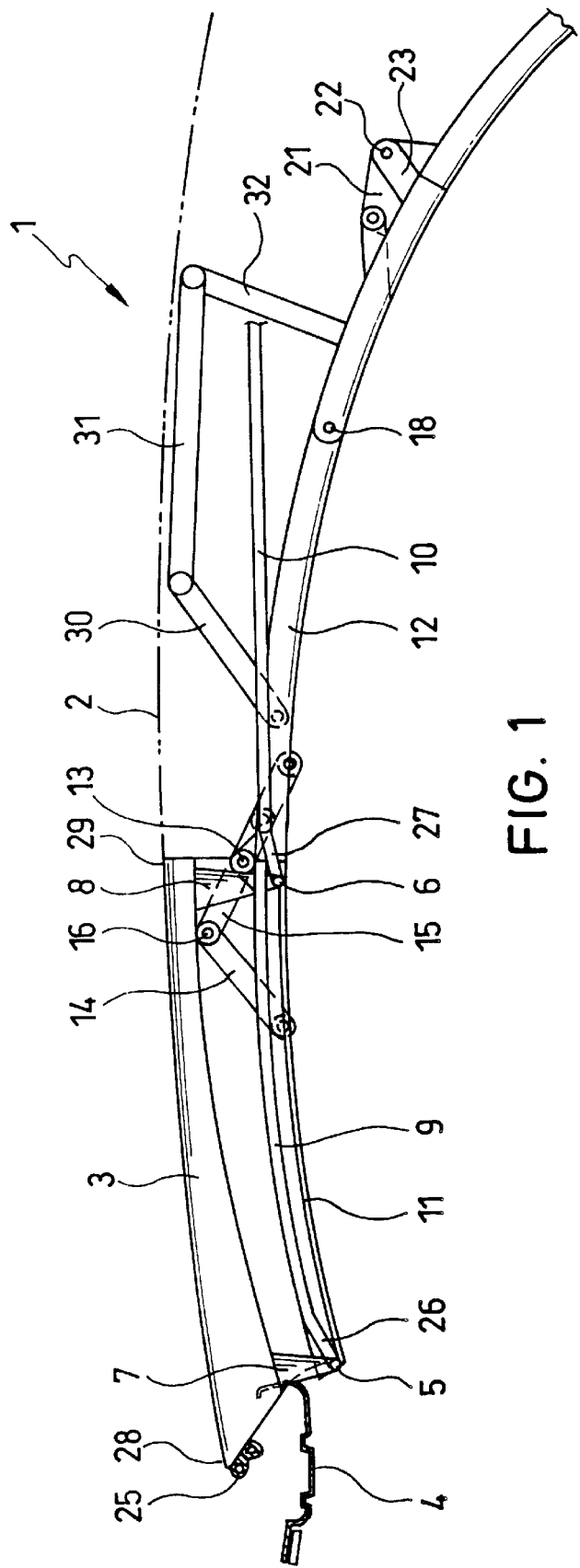
FIGS. 1 to 6 are side elevational views in schematic form of a first embodiment of a folding roof for a convertible showing respective positions proceeding from a closed folding roof position in FIG. 1, through intermediate positions, to an open, lowered top position in FIG. 6.

A folding roof 1 of a convertible comprises a textile canvas top 2 which is attached to a front bow 3 which forms the middle part of the tip of the folding roof, which extends, with the top 1 closed, from a front cross member 4, a top front window frame or a wind deflector attached thereto on the top edge of the front window, over the passenger compartment to the body in the rear area of the vehicle or convertible (see especially, FIGS. 1 & 4) and is attached there in a conventional manner, for example, at the equator. The front bow 3 extends conventionally crosswise over the width of the top 1 and is supported to be able to move lengthwise in a guide means on each side via one front and one rear sliding element 5, 6, which are made or located on the front and rear supports 7, 8 of the front bow 3; this guide means has a front and a rear guide rail 9 and 10. Since the folding roof 1 is formed essentially symmetrical to the lengthwise axis of the vehicle, the description here is limited essentially to the components of the folding roof and top mechanisms on the left side of the vehicle in the direction of forward travel; but, at the same time, they also apply to the right-side components. The two guide rails 9, 10 are attached on a front or a rear side member, or roof rod 11 and 12 of the top mechanism, or are made integrated with them.

Figure 5:
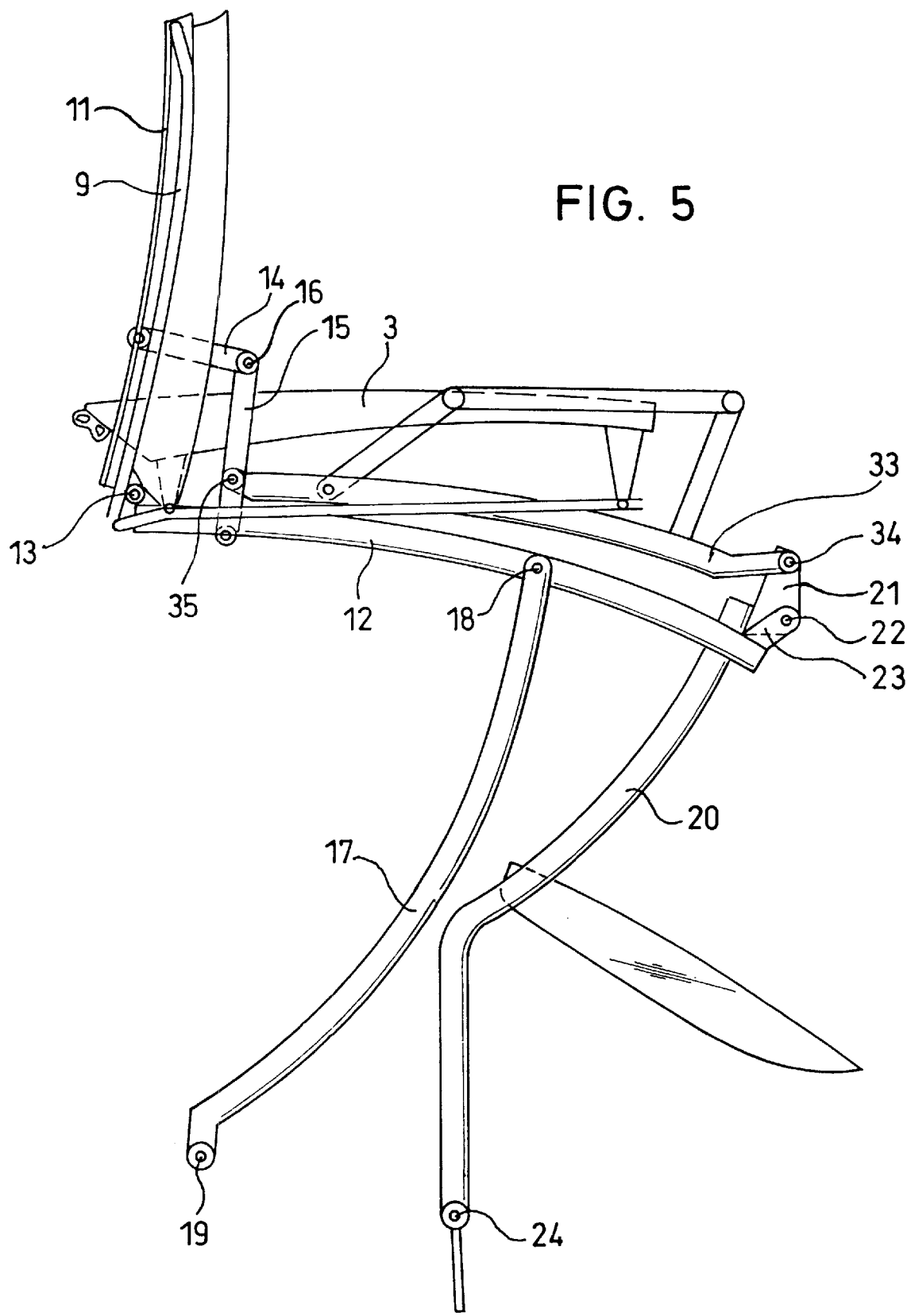

The front roof rod 11 is pivotally coupled to the rear roof rod 12 via a joint 13 (see, FIGS. 1 & 5) and is also coupled to it via an auxiliary rod arrangement with a first pivot lever 14 which is pivotally mounted on the front roof rod 11 and a second pivot lever 15 which is pivotally mounted on the rear roof rod 12 and is hinged to the first pivot lever 14 at a joint 16. As shown in FIG. 1A, each front roof rod 11 may be composed of two successive roof rod elements 11a, 11b which are connected to one another by a joint 11c which can be similar to the joint 13.

The rear roof rod 12 is movably supported via a parallelogram-like four-bar arrangement (see FIG. 5) which has a main column 17 which is coupled, on the one hand, at a joint 18 to the rear roof rod 12, and on the other hand, at a joint 19 to the vehicle body B which is only partially represented, and a main connecting rod 20, to the top end of which is attached a laterally offset bearing plate 21 which is pivotally joined at a pivot joint 22 on a side projection 23 of the rear roof rod 12, and which is coupled on its bottom end at a joint 24 to the vehicle body B.

Figure 1A:
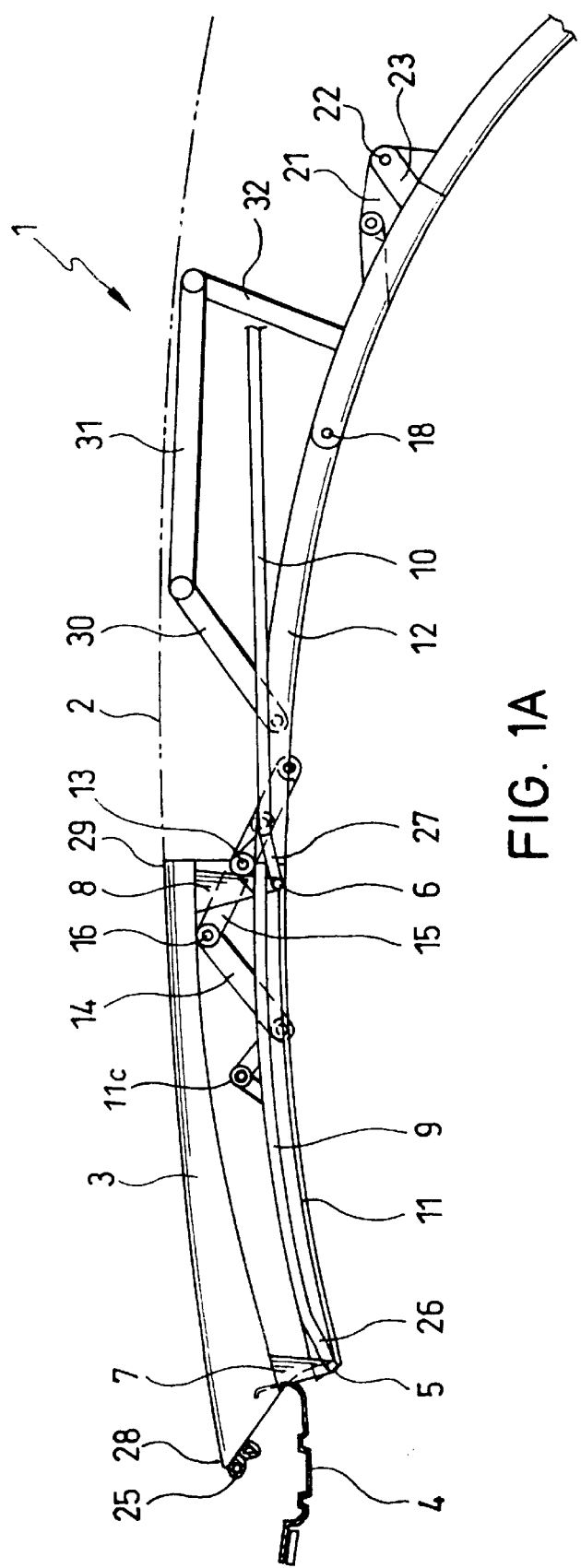
FIG. 1A is a view corresponding to that of FIG. 1, but showing a modification in which the front roof rod is composed of two rod elements connected together by a joint.
Figure 2:
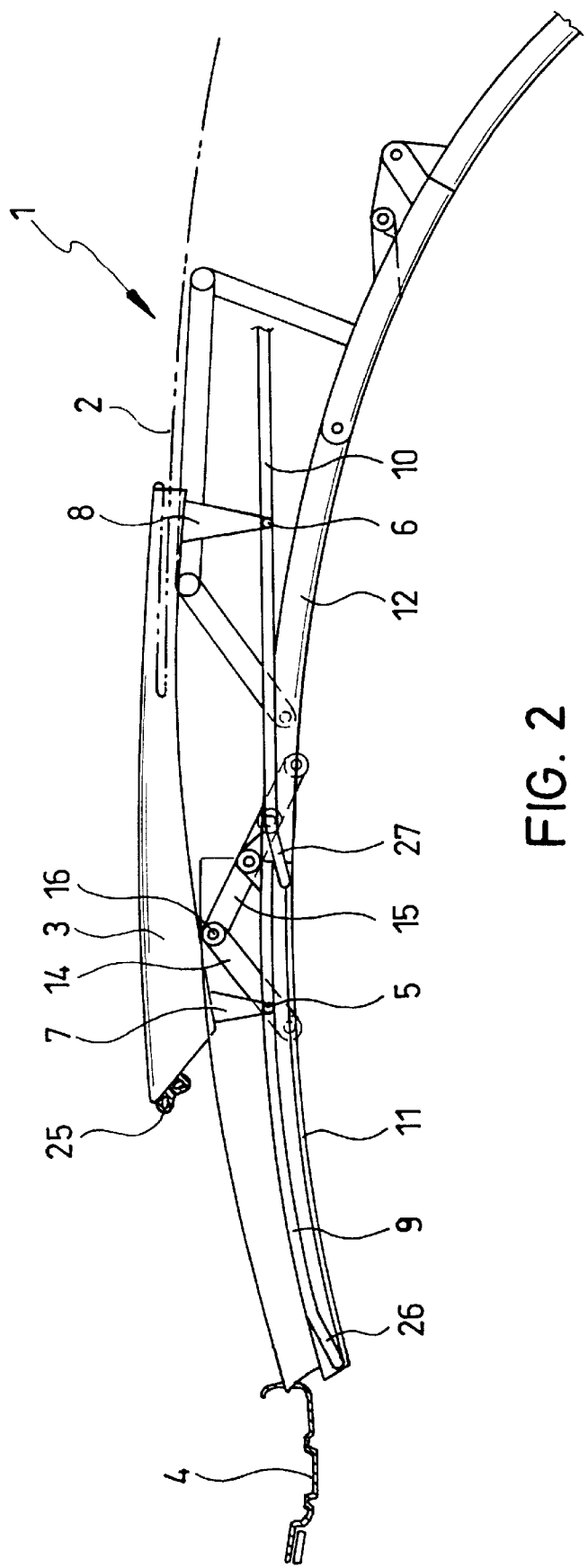
Figure 3:
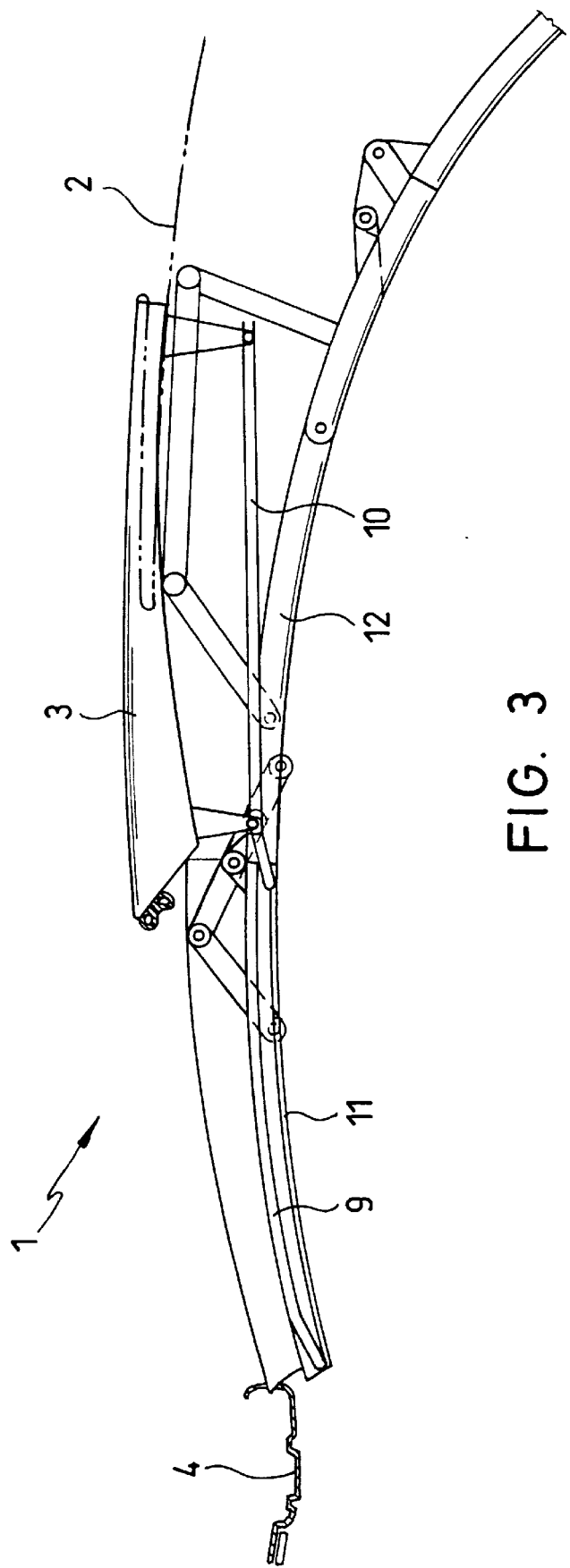
Figure 4:
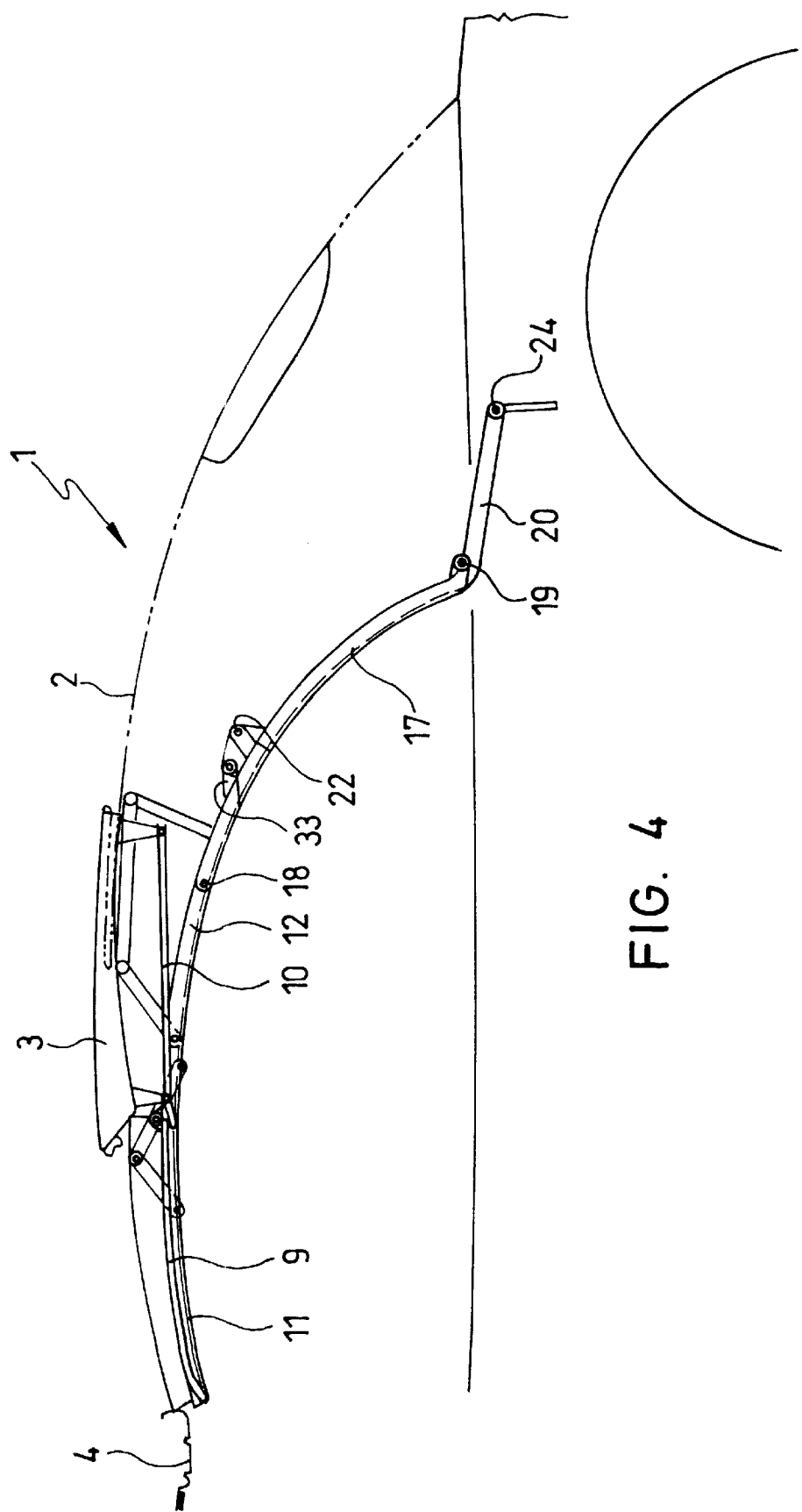

In the closed position as shown in FIG. 1, and in one of the partially open position or the intermediate position of the folding roof 1 as shown in FIG. 4, the front and the rear roof rod 11 and 12 are held by the main column 17 and the main connecting rod 20 of the four-bar arrangement on the contour of the top edge of the side window of the vehicle, a contour labeled as the K-line. The main column 17 and the main connecting rod 20 when viewed sideways as shown in FIGS. 1 to 4 lie on top of one another on the rear edge of the side window and thus form the continuation of the front and rear roof rods 11, 12 to a point located under the equator of the convertible (dot-dash line E). Seals for the side windows are attached to the roof rods 11, 12 and the main connecting rod 20.

In the closed position as shown in FIG. 1, the front roof rod 11 is supported on a cross member 4, on a wind deflector provided there, or the A column, and is locked to a lock means (not shown). The front bow 3 adjoins the cross member 4, a seal 25 on the front end of the front bow 3 sealing it against the cross member 4. The front guide rail 9 contains a front gradient section 26 for the front sliding element 4 and the rear guide rail 10 contains a front gradient section 27 for the rear sliding element 6.

When the folding roof 1 is opened into an intermediate position, the front bow 3 is pushed translationally to the rear by a drive (not shown) which is integrated, for example, on the rear roof rod 12 and is connected via bilateral gradient cables or Bowden cables to the front bow 3 for transmission of motion (motion from the FIG. 1 position to that shown in FIG. 2), being raised by the elements 5, 6 which slide initially in the gradient sections 26, 27 of the guide rails 9, 10, both on its front edge 28 and also on its rear edge 29. When the front bow 3 is moved back, first the relieved canvas top 2 arches behind the front bow 3 since here is it without a fixed connection to a bow of the top mechanism. In the closed position of the top 1, the canvas top 2 is held in shape either by the tension over the support part, for example, a bow, which is shown schematically by three holding elements 30, 31, 32 or it is attached to the bow. The front bow 3, which continues to move back and on which the canvas top 2 is attached, is pushed over the canvas top 2 which lies behind and which folds into a Z-shape, or accordian pleat (see folds F), in doing so (FIG. 2) as far as the intermediate position which is shown in FIG. 3, and in which the top 1 is partially opened in the manner of a sliding roof. Here, both the front and also the rear sliding element 5,6 of the front bow 3 are located in the rear guide rail 10 on the rear roof rod 12. However, also different intermediate positions of the front bow 3 as driving positions can be set, for example, the position shown in FIG. 2. By means of this translational displacement, the front bow 3, which conventionally has a raised curvature or arch which extends over the width of the top, lies over the next stationary or movable bow 31 which likewise has an arch in the identically cambered direction, i.e., the arches face in the same direction. A much smaller lowered height of the top 1 is achieved by this configuration.

To completely open the top 1, the four-bar arrangement of the top mechanism is moved by the drive in order to bring the top 1 into the rear lowered position, in which it is folded and lowered into a storage space. In this way, by means of a main drive (not shown) which engages, for example, the rear main connecting rod 20, this main connecting rod 20 is swung (see FIG. 5), by the forced guidance of the parallelogram-like four-bar arrangement, so that the rear roof rod 12 is pushed parallel to the rear or offset around the two hinge points 19 and 24 on the body in essentially a horizontal alignment.

Figure 6:
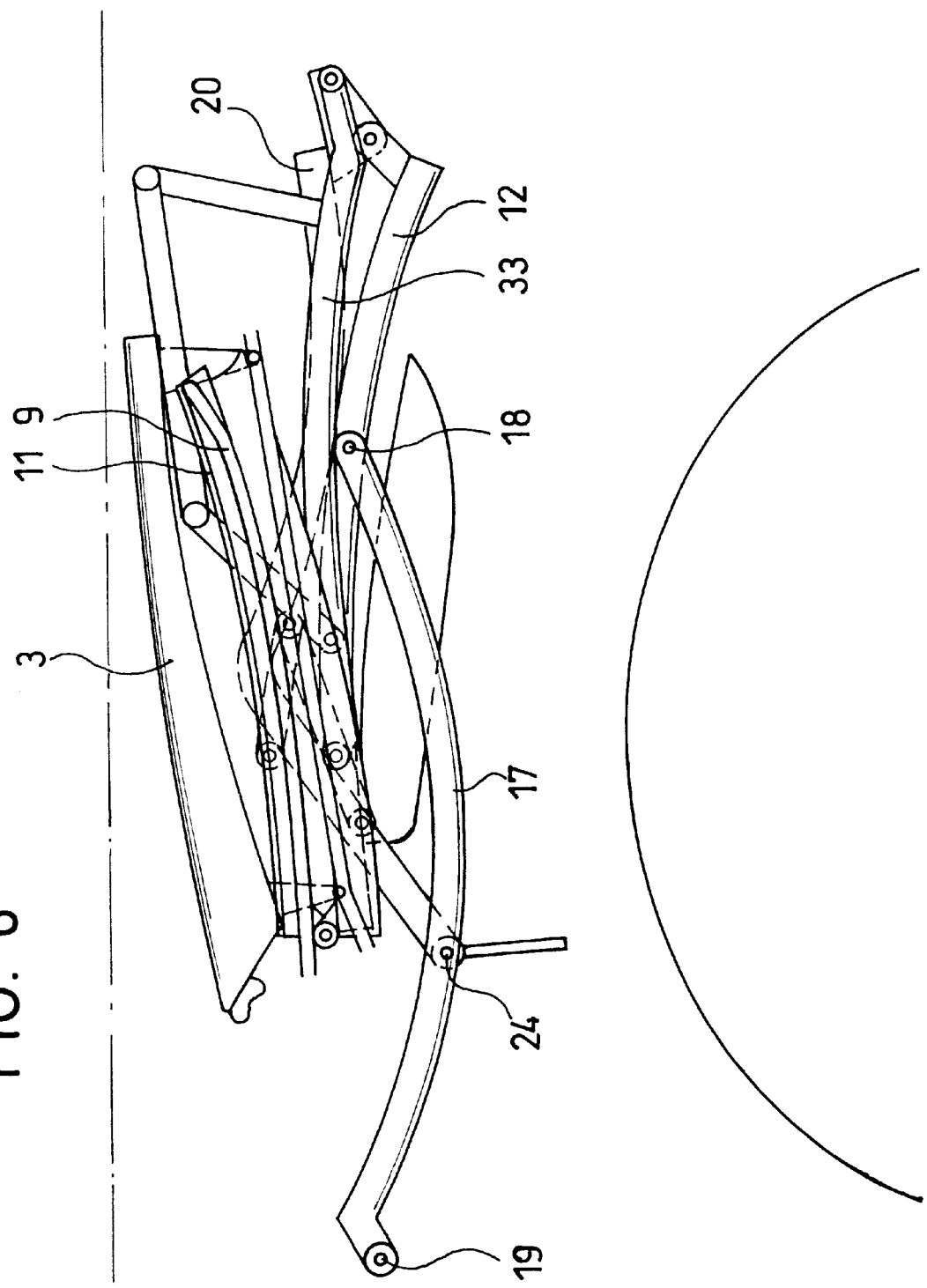

A connecting rod 33 (see, FIG. 5) is coupled on the rear end, via a joint 34, to the bearing plate 21 of the main connecting rod 20 and is hinged on the front end, by a joint 35, to the second pivot lever 15 of the rod arrangement, between the front and the rear roof rod 11, 12. In the above described pivoting of the four-bar arrangement, the connecting rod 33 is shifted to the rear relative to the rear roof rod 12 and pivots or folds the front roof rod 11, via the auxiliary rod arrangement 14, 15, 16, around its pivot bearing axis 13, which runs, for example, roughly perpendicular to the plane of the drawing, to the rear and laterally past the front bow 3 until, as shown in FIG. 6, it rests roughly on the rear roof rod 12. In this position, the top 1 is folded and lowered into the storage space, the front bow 3 and any other top bows lying with a uniform camber, and thus in a space-saving manner, on top of one another. Thus, the front bow 3 can be used as a cover of the storage space.

The top 1 is closed via the described intermediate positions in the opposite direction of motion.

Instead of the illustrated pivoting or swinging-in of the front roof rod 11 roughly around the transverse axis of the vehicle, it is also possible to pivot or swing-in the front roof rod 11 in other planes. The auxiliary rod arrangement 14, 15, 16 is then modified accordingly in order to drive the front roof rod 11 in the other pivot planes such as, for example, in a roughly horizontal plane, in this case the right and the left front roof rods 11 adjoin one another after swinging roughly in the transverse direction of the vehicle.

Figure 7:
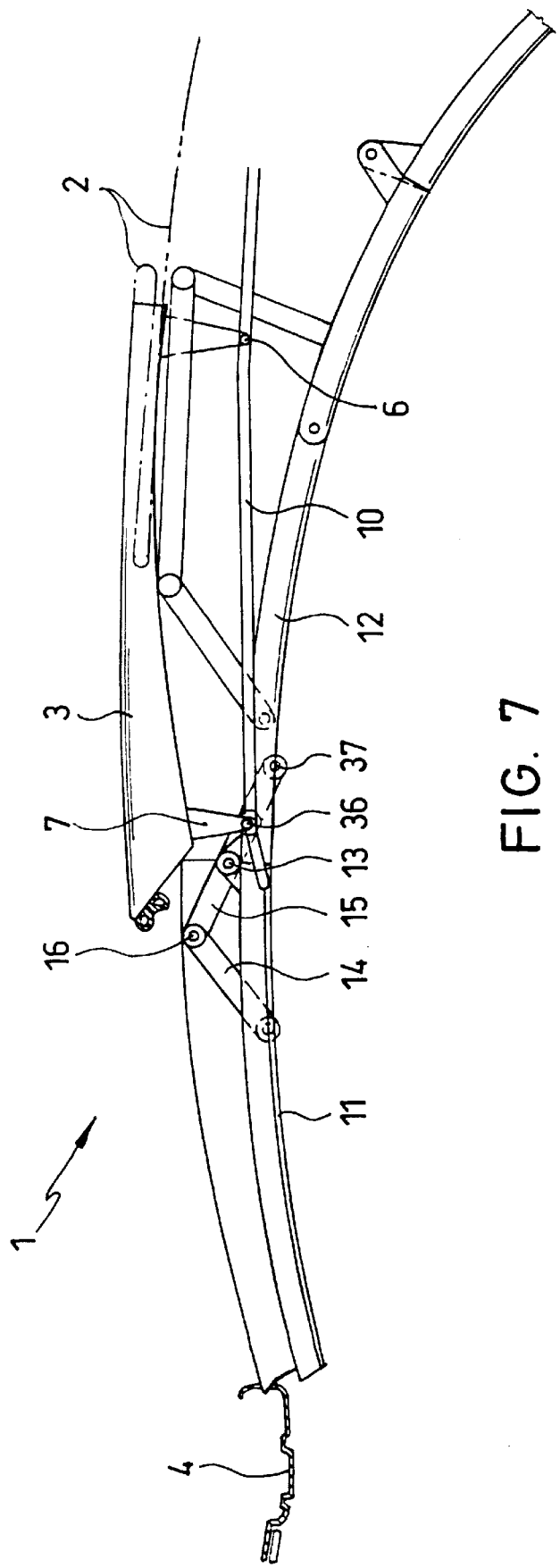
FIGS. 7 to 9 are side elevational views in schematic form of a second embodiment of a folding roof showing different positions proceeding from a partially open position in FIG. 7 to a completely open position in FIG. 9.
Figure 8:
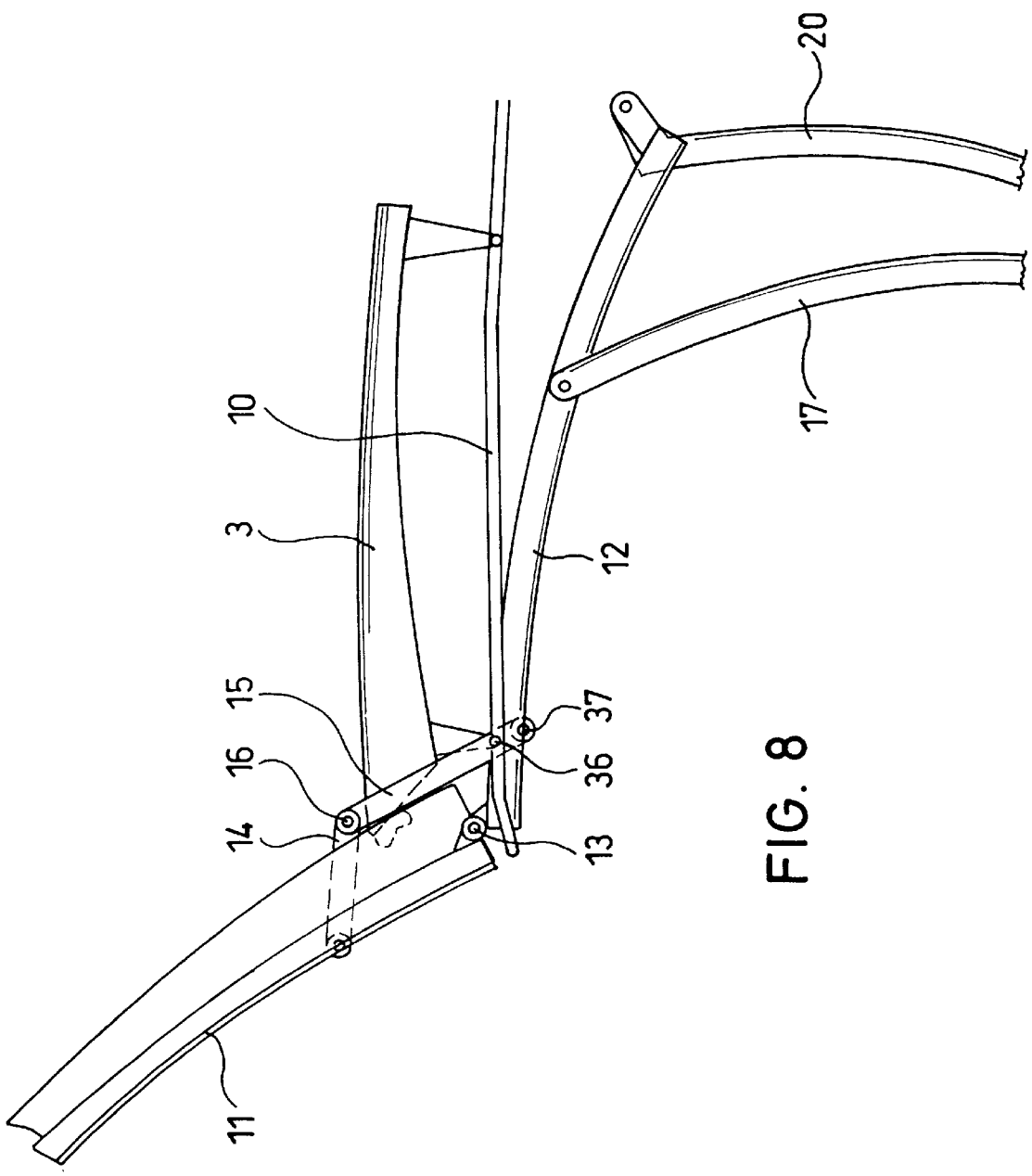
Figure 9:
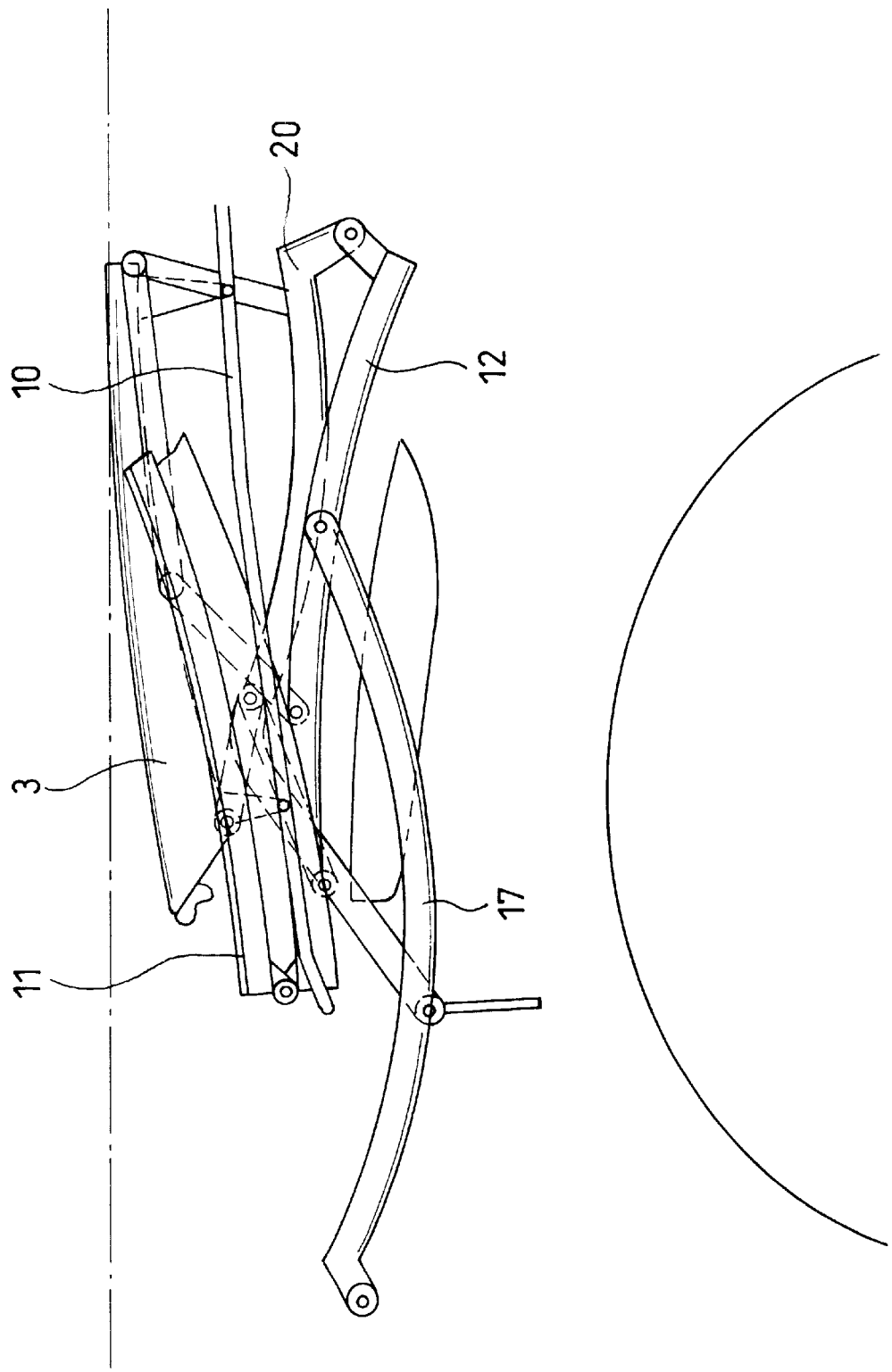
Figure 10:
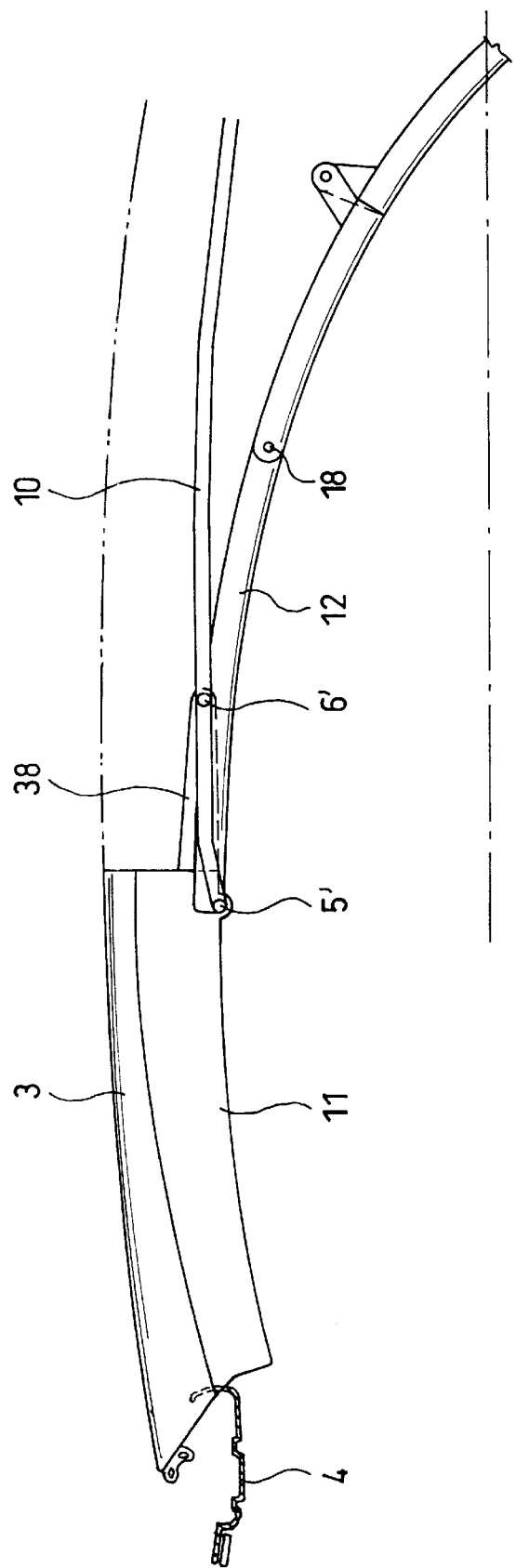

In one modified embodiment of the folding roof 1 (see FIG. 7 to 9), the pivoting of the front roof rod 11 is executed by the front bow 3 in a kinematic coupling by a journal 36 which is located on the front support 7 and which is located, for example, coaxially to the sliding element 5, when the front bow 3 is moved backwards, engaging the second pivot lever 15 of the auxiliary rod arrangement and swinging it around its coupling 37 to the rear roof rod 12; at the same time, via the first pivot lever 14, the front roof rod 11 is swung in the described manner in the joint 13. Thus, in this embodiment, a connecting lever 33 is unnecessary and the pivoting of the front roof rod 11 can be produced by the displacement motion of the front bow 3 independently of the lowering motion of the folding roof 1 which is transmitted by the four-bar mechanism.

In the embodiment of the top 1 which is shown in FIGS. 10 to 13, the front bow 3 contains as the front end of the top, the front roof rods 11 and a lock mechanism (not shown) for locking the front roof rod 11 on the top cross member 4 or the front window frame or the A-column.

The front bow 3, on each side, has a support part 38 which projects to the rear and which has a rear extension on which the two sliding element 5' and 6' are supported in spaced relationship in the lengthwise direction, both of the sliding elements 5', 6' being located in the guide 10 of the rear roof rod 12. When the front bow 3 is pushed translationally to the rear along the guide 10, the top 1 opens in the intermediate position as shown in FIG. 11, including the front side roof rod 11 which is integrated into the front bow 3. The canvas top 2, in turn, forms the already described Z-fold. With sufficient stability of the side frame parts of the top, i.e., of the rear roof rod 12 and the main column 17 and of the main connecting rod 20, this intermediate position can be attained during driving.

Figure 12:
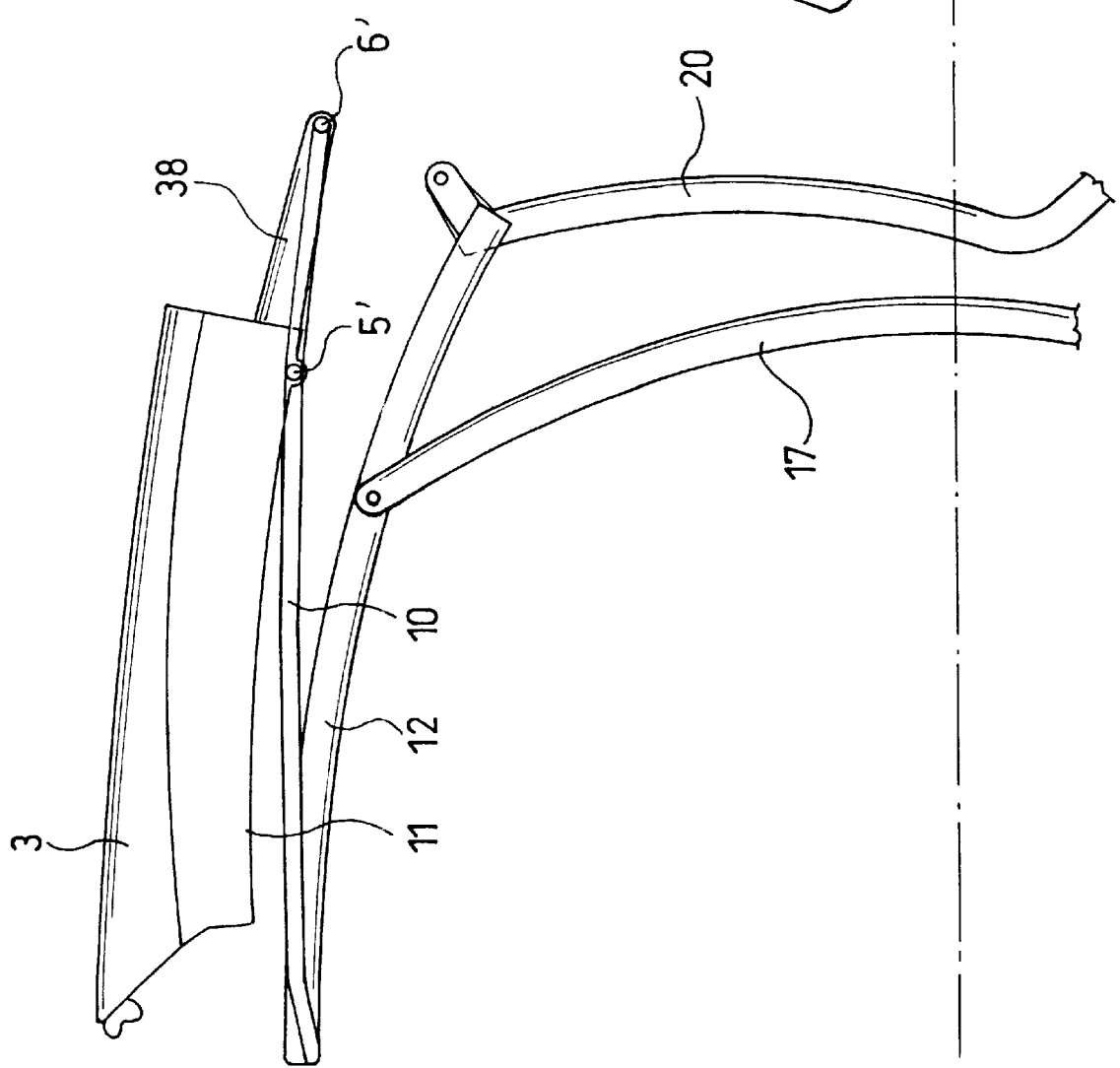
Figure 13:
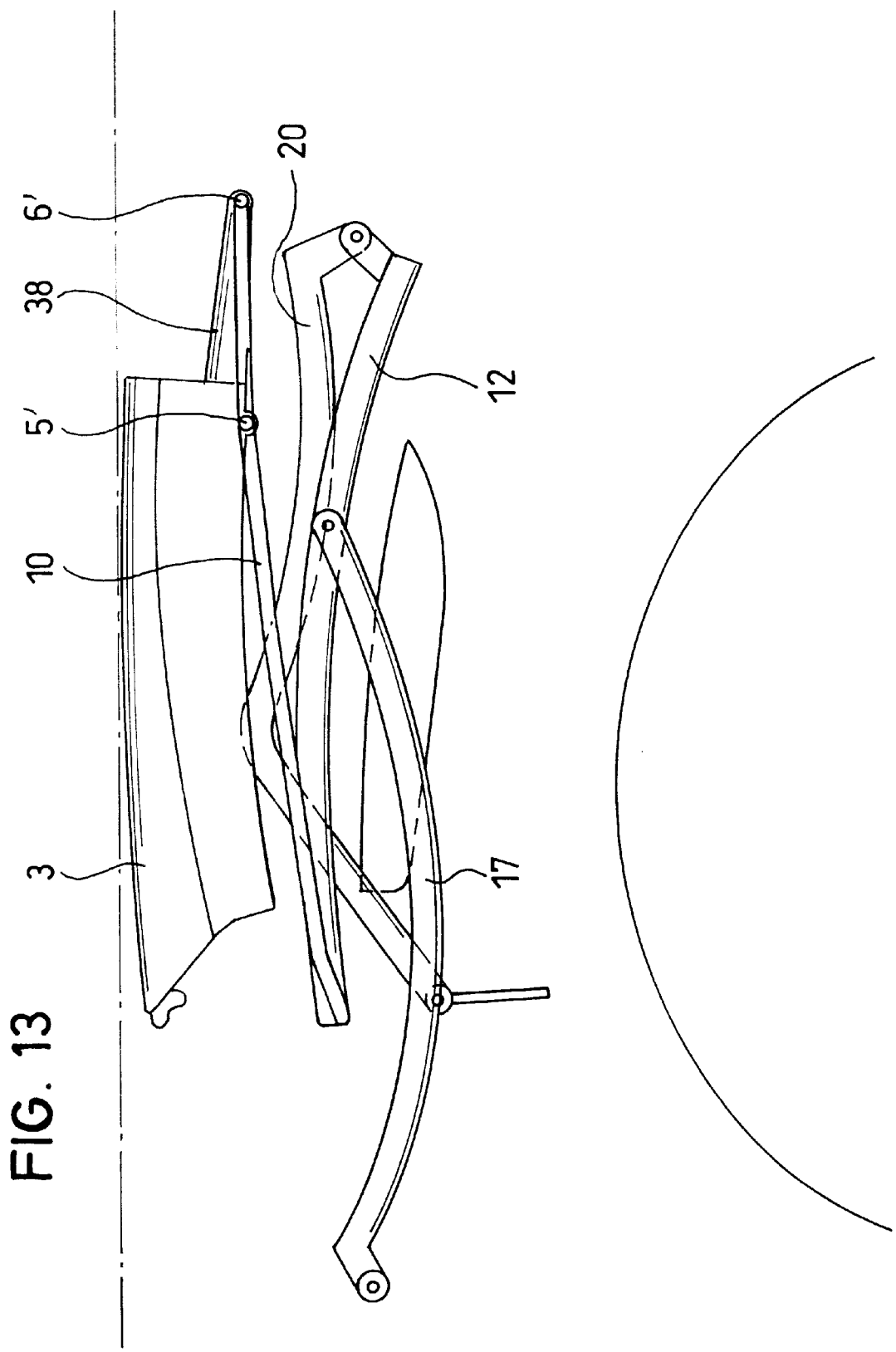

By further swinging of the four-bar arrangement, the folding roof 1 is folded and lowered into the lowered position in the storage space (FIG. 13) via the position shown in FIG. 12. The folding roof 1 can be unfolded again by the opposite sequence of motions and closed over the passenger compartment.

Another embodiment of a pivot joint with which the front side member or roof rod 11 is pivotally supported on the rear roof rod 12 and a driven pivoting means which executes the pivoting of the front roof rod 11 are shown in FIGS. 14 to 18. Here, the rear right roof rod 12 forms a solid unit or roof cassette 41 with the main bow 40 and the opposite left roof rod 12' (see, FIG. 18), and is therefore, also called the side part 42 of the roof cassette. The side part 42 or 42' of the roof cassette represents the top connecting part of the four-bar arrangement and is held on the pivot bearing 18 by the main column 17 and on the pivot bearing 22 by the main connecting rod 20.

The side part 42 of the roof cassette, on its inside, contains a pivot bearing 43 (see FIG. 14) with a pivot axis 44, which dictates the pivot plane of the roof rod 11, and which is aligned especially vertically for pivoting support of a carrier 45 which is permanently connected to the front side member or the roof rod 11. In the side part 42 of the roof cassette, a horizontal elongated guide 46 is formed in which a sliding part 47 is movably held. The sliding part 47 has a projection 48 which projects laterally inward and to which an intermediate rod 49 is pivotally coupled. The intermediate rod 49 is pivotally mounted at its opposite end on the carrier 45 via a pivot joint 50 for rotation around a vertical pivot axis 51 which is parallel to and spaced from the pivot axis 44. With the roof rod arrangement folded out as shown in FIG. 14, a triangular arrangement is formed by the pivot axes 44, 51 and the coupling to the projection 48 so that rearward displacement of the sliding part 47 from the position shown in FIG. 14 swings the pivot joint 50, and thus the carrier 45 with the roof rod 11, inward around the axis 44 (see FIGS. 15–17).

The sliding part 47 is hinged via an intermediate rod 52 to the lever arm 53 of a ring 54. The ring 54 is pivotally mounted on the side part 42 of the roof cassette concentrically to the pivot bearing axis 18 of the main column 17 and can be coupled so as not to rotate relative to the main column 17, such that the main column 17 entrains the ring 54 over a certain pivot angle of its pivot swivel path relative to the side part 42 of the roof cassette, by which the roof rod 11 is swung via the described elements.

Figure 14:
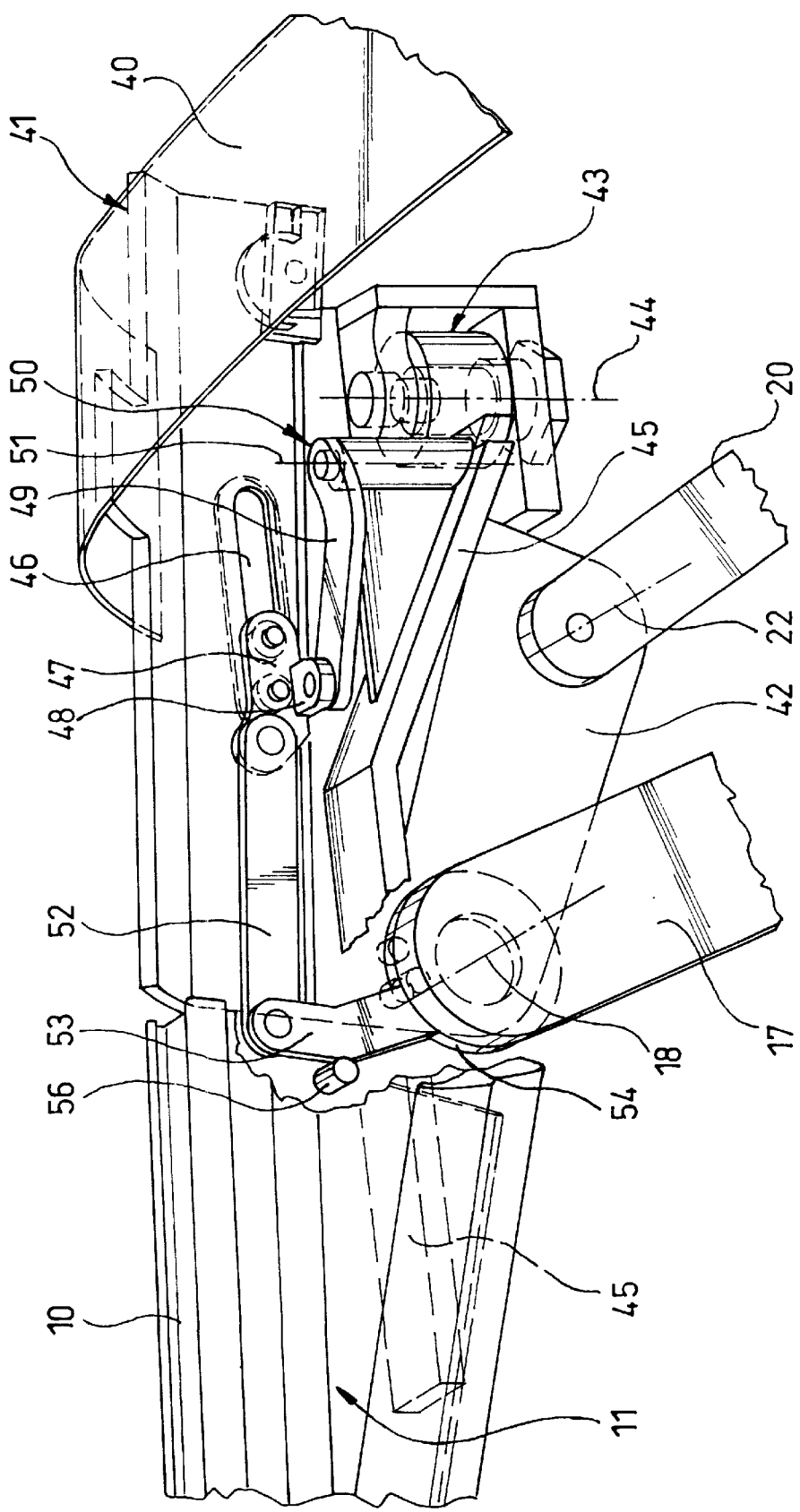
FIGS. 14 to 18 each show, in perspective view, a respective position of a hinge arrangement for a side roof rod which can be pivot into different positions.
Figure 15:
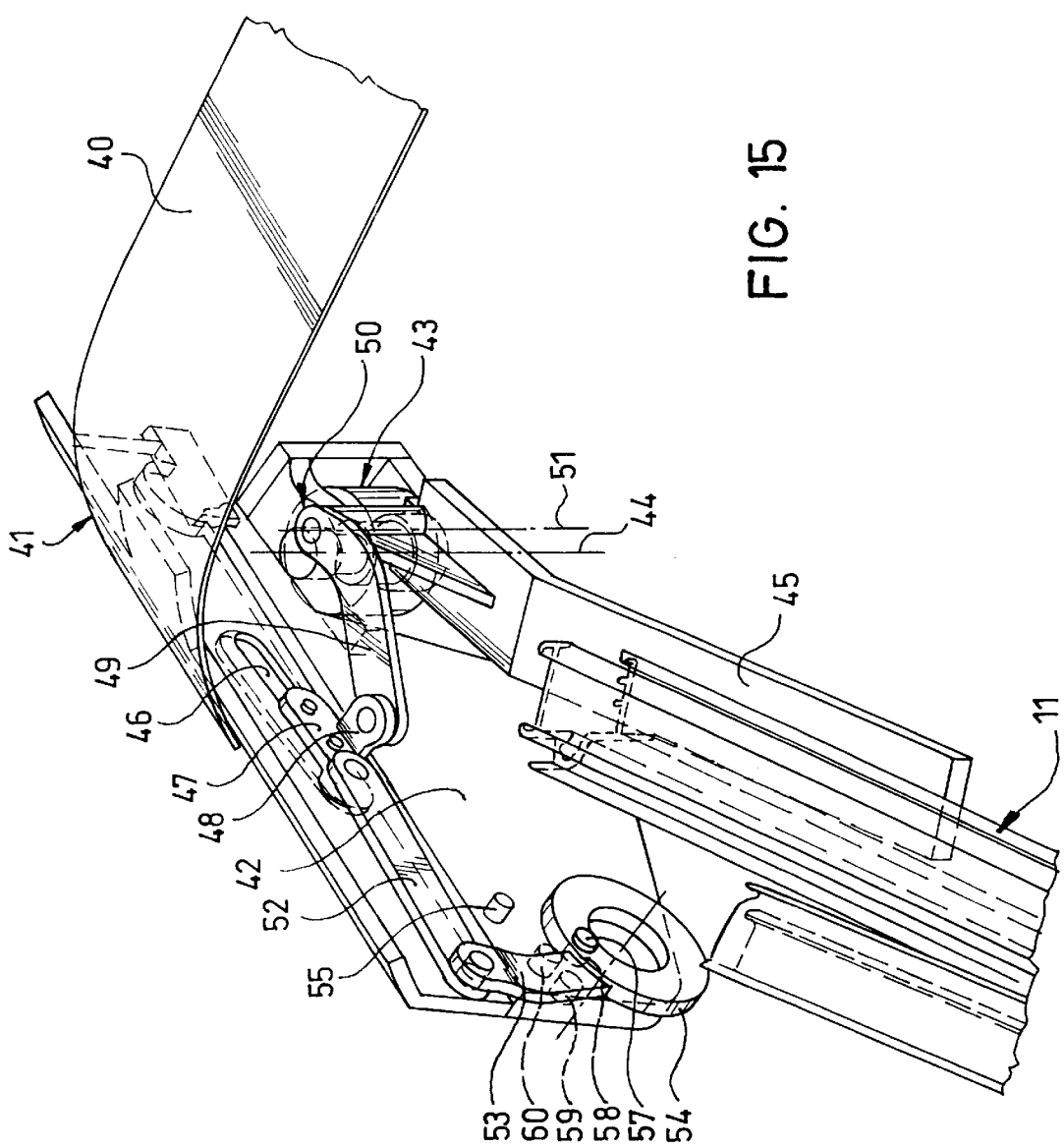
Figure 16:
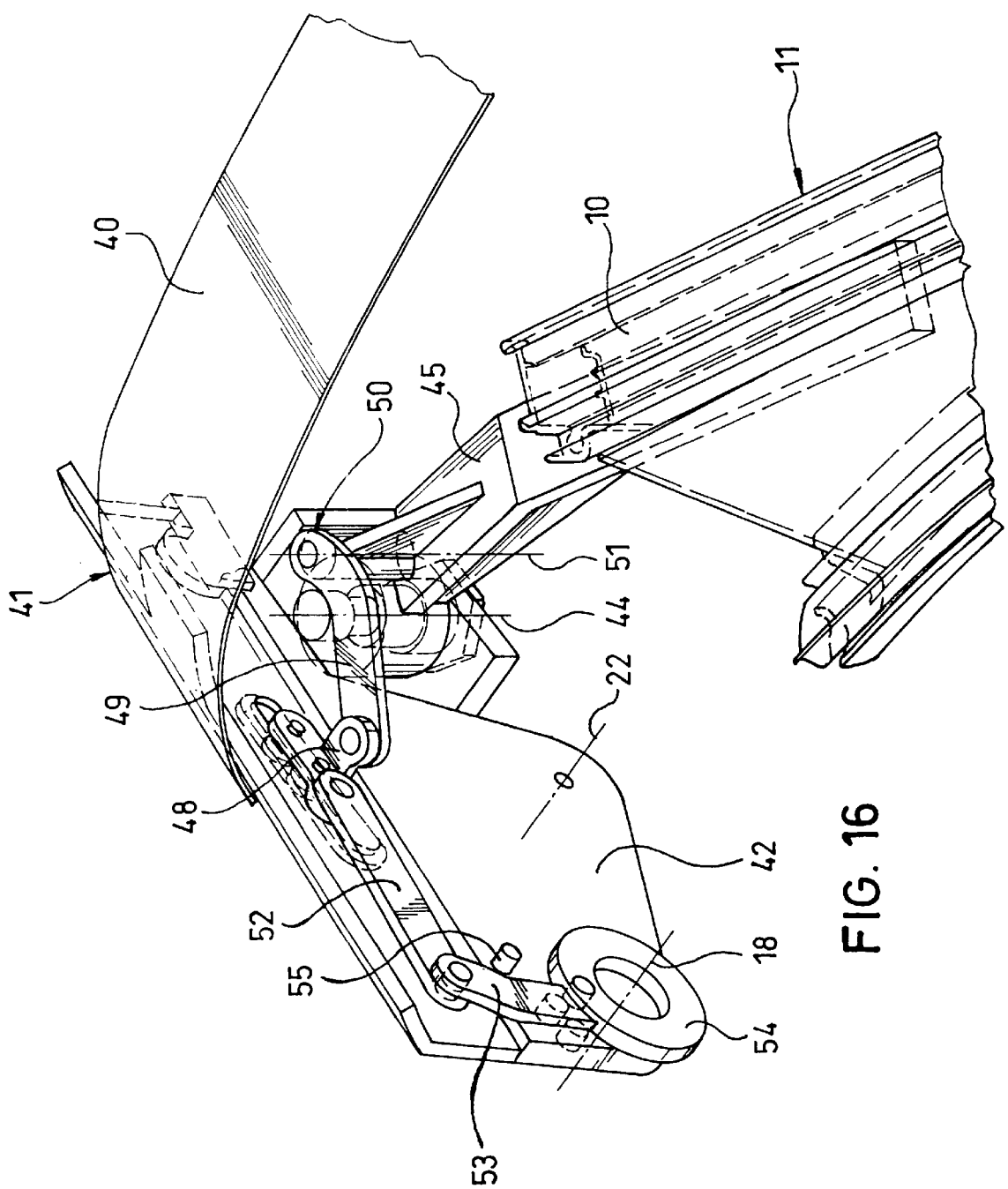
Figure 17:
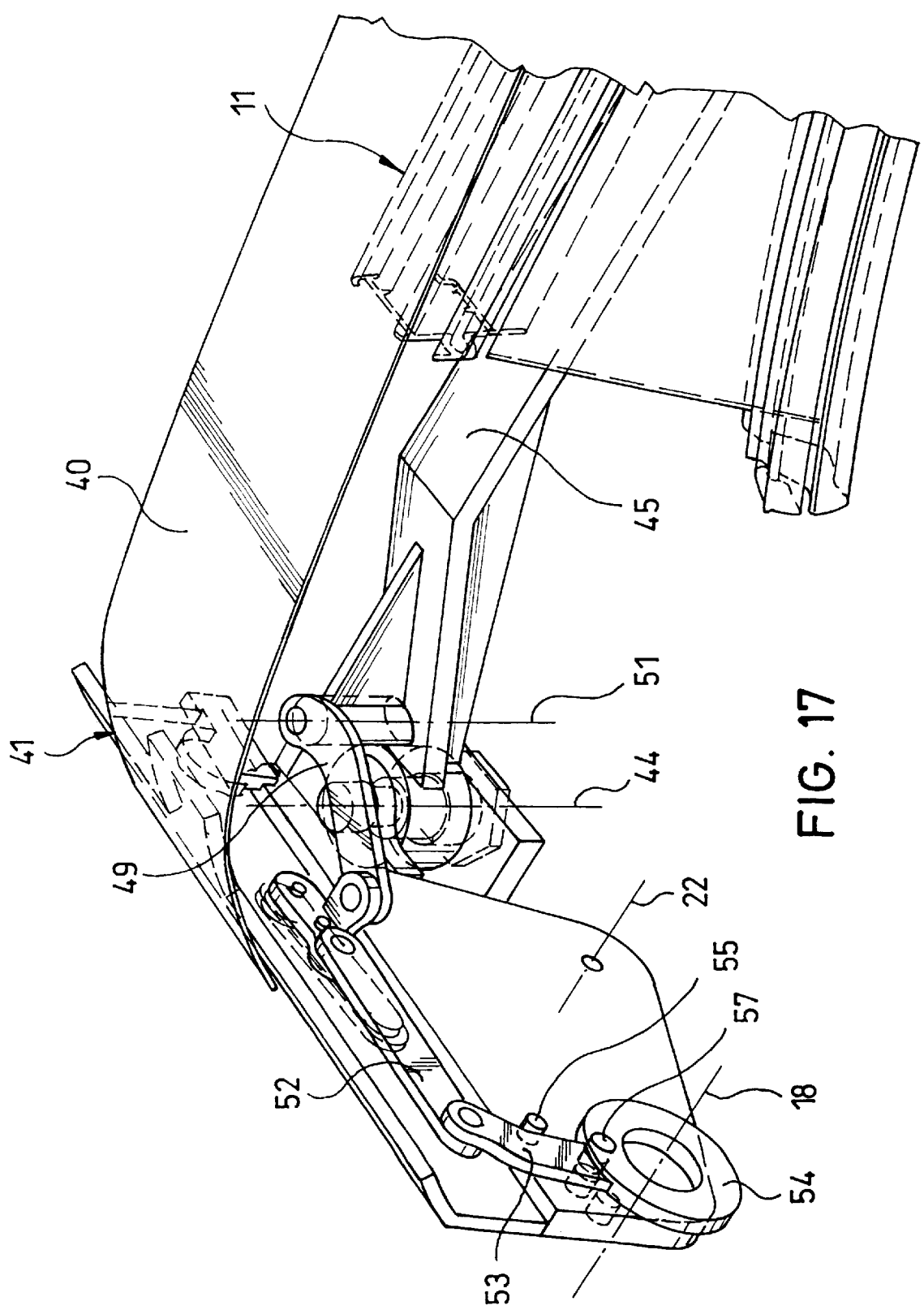
Figure 18:
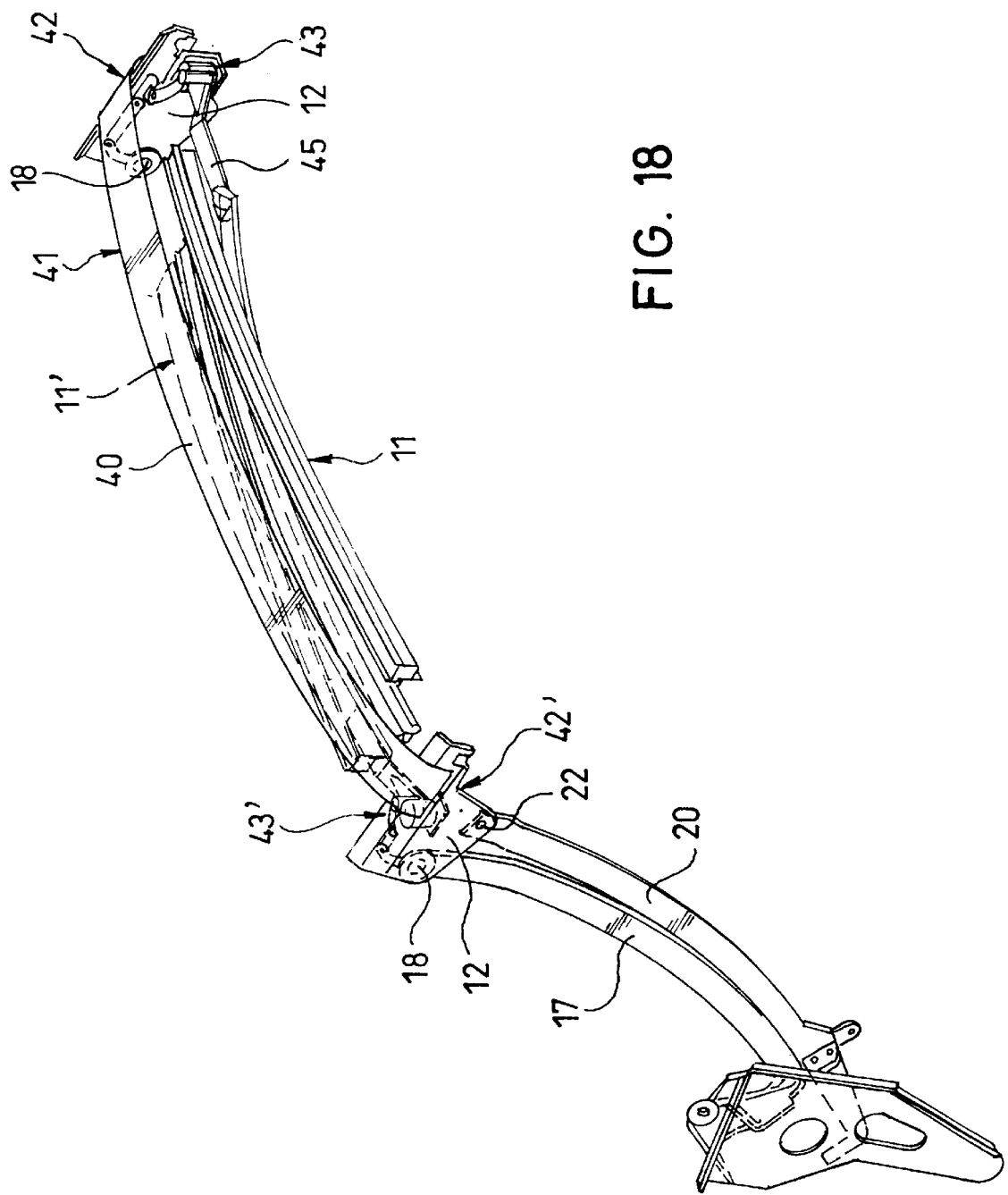

The pivot path of the ring 54, and thus the pivot angle of the roof rod 11, are limited in a defined manner by a stop 55 on the side part 42 of the roof cassette (see FIG. 17) and a stop 56 on the pivoting roof rod 11 (see, FIG. 14). The stops 55, 56 can be pin-like projections or the like.

A lock means for coupling of the ring 54 to the main column 17 without relative rotation over a certain pivot area of the main column relative to the side part 42 of the roof cassette contains a lock pin 57 (see, FIG. 15) which is supported in a hole 58 of the ring 54 and is pressed by a spring element against the side of the main column 17 which adjoins the ring 54. In the main column 17, a recess is formed into which the lock pin 57 is partially pressed when it is located congruently to the lock pin 57 when the main column is pivoted so that relative rotation resistant coupling is formed between the main column 17 and the ring 54. After the provided common pivot path, the lock pin 57 is pressed out of the recess of the main column 17, and in doing so fits, partially into one of two holes 59 and 60, which are located opposite one another in the side part 42 of the roof cassette.

Thus, the rotary coupling is again cancelled and the main column 17 can be swung further in the two pivot directions without forced coupling to the roof rod 11. The two holes 59 and 60 are positioned such that they are assigned to the two swivel end positions of the ring 54 over the lock pin 57.

On the opposite left side part 42' of the roof cassette (see, FIG. 18), the pivot joint 43' is offset to the front in the lengthwise direction of the folding roof or vehicle relative to the pivot joint 43 of the right side part 42 of the roof cassette so that the left roof rod 11' which has been swung-in lies in a transverse alignment roughly parallel in front of the right, swung-in roof rod 11.

Figure 19:
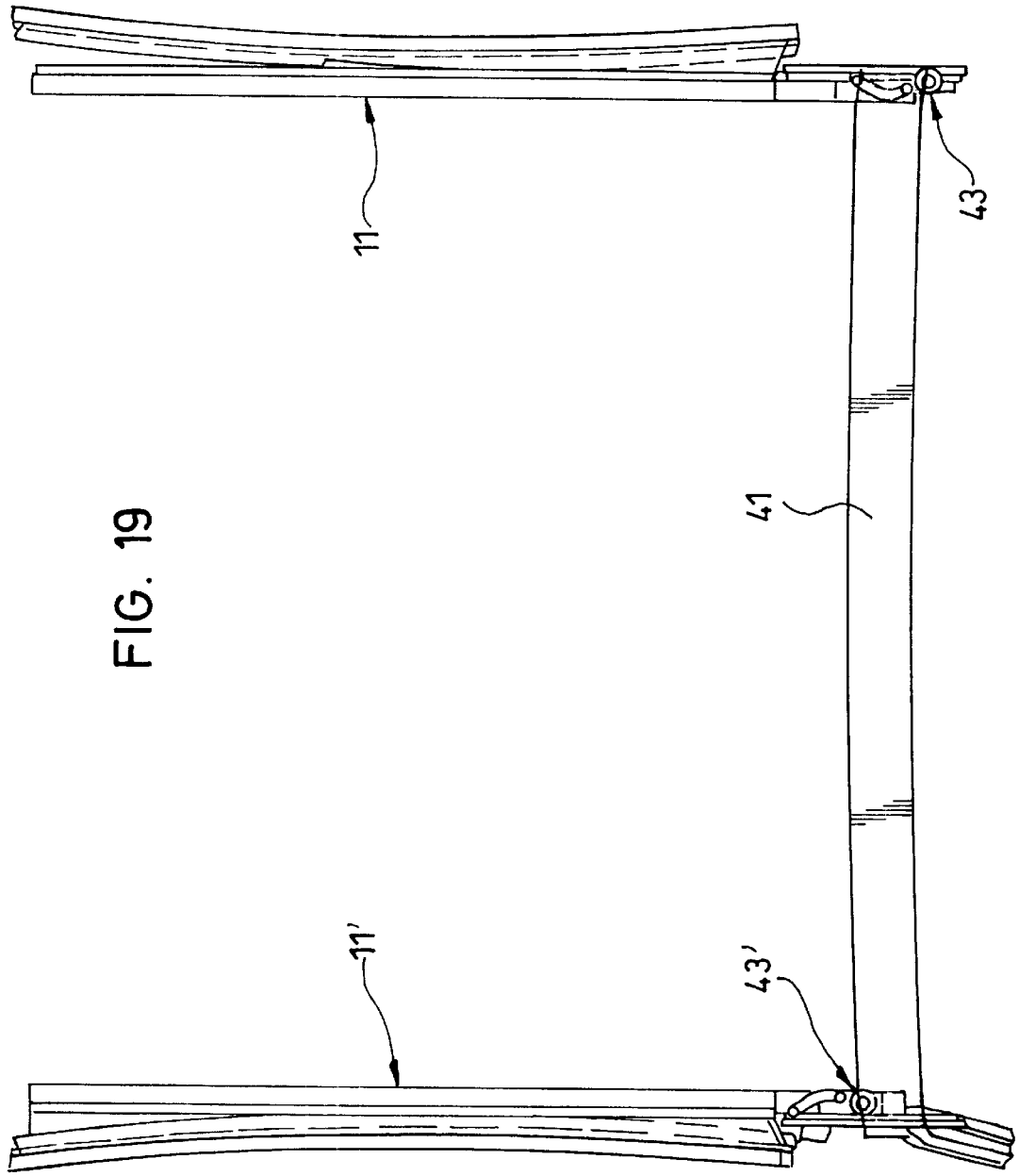

FIGS. 19 and 20 show the top mechanism with the bilateral front side members or roof rods 11 which, with a joint and pivot arrangement which is modified compared to the above described embodiment, is pivoted to the outside by a certain angle α in the lowered position when the roof cassette 41 is pivoted rearward, so that the roof rods 11, when lowered into the storage space next to the main column 17 and the main connecting rod 20, can be accommodated in a side lining. The angle α is dependent on the specific arrangement and is, for example, approximately 8° to 10°.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Folding roof for a convertible, comprising:
    a front bow;
    a canvas top which is attached to the front bow;
    a top mechanism having a side roof rod on each lateral side of the folding roof for opening the folding roof by moving the canvas top and front bow into a rear lowered position;
    guides on each side roof rod along which the front bow is guided to move in a lengthwise direction rearwards from a closed position in which it adjoins a fixed vehicle front cross member into an intermediate position in which the canvas top is partially opened,
    wherein the front bow forms a cover for a storage space.

2. Folding roof as claimed in claim 1, wherein each side roof rod is divided into a front roof rod and a rear roof rod which, in the closed position of the canvas top, are rigidly coupled to form an essentially rigid top frame which is coupled to the cross member, and which, in fully open, storage position of the canvas top, are released from the rigid coupling and are stored in a compact arrangement.

3. Folding roof as claimed in claim 2, wherein the front bow contains the front roof rods, the front bow being supported on the guides of the rear roof rods and is jointly movable with the front roof rods into said intermediate position.

4. Folding roof as claimed in claim 2, wherein an auxiliary rod arrangement is position to be actuated by movement of the front bow rearward from a defined intermediate position for pivoting of the front roof rods.

5. Folding roof as claimed in claim 2, wherein a drive for the front bow is located on the rear roof rod and is connected to the front bow via a cable mechanism.

6. Folding roof as claimed in claim 2, wherein the front bow is constructed and arranged to lock or unlock a lock means for fixing the roof rods on the cross member during displacement of the front bow from said intermediate position.

7. Folding roof as claimed in claim 2, wherein the front roof rods are each composed of two successive roof rod elements which are connected to one another by a joint.

8. Folding roof as claimed in claim 1, wherein the front bow is supported by sliding elements on the guides.

9. Folding roof as claimed in claim 8, wherein the guides have gradient sections which raise the front bow from its closed position during opening movement thereof.

10. Folding roof for a convertible, comprising:
    a front bow;
    a canvas top which is attached to the front bow;
    a top mechanism having a side roof rod on each lateral side of the folding roof for opening the folding roof by moving the canvas top and front bow into a rear lowered position;
    guides on each side roof rod along which the front bow is guided to move in a lengthwise direction rearwards from a closed position in which it adjoins a fixed vehicle front cross member into an intermediate position in which the canvas top is partially opened, each side roof rod being divided into a front roof rod and a rear roof rod which, in the closed position of the canvas top, are rigidly coupled to form an essentially rigid top frame which is coupled to the cross member, and which, in fully open, storage position of the canvas top, are released from the rigid coupling and are stored in a compact arrangement,
    wherein the front bow is supported, in a defined intermediate position, on the guides of the rear roof rods, the front and the rear roof rods being pivotally joined to one another by a pivot joint, the front roof rods being pivoted to lower the canvas top into the storage position, the pivot joint joining the roof rods having a substantially vertical pivot axis.

11. Folding roof as claimed in claim 10, wherein the pivot joint joining the roof rods has a pivot axis extending transverse to said lengthwise direction.

12. Folding roof as claimed in claim 10, wherein the front roof rod is pivotable through an angle roughly 8–10°.

13. Folding roof for a convertible, comprising:
    a front bow;
    a canvas top which is attached to the front bow;
    a top mechanism having a side roof rod on each lateral side of the folding roof for opening the folding roof by moving the canvas top and front bow into a rear lowered position;
    guides on each side roof rod along which the front bow is guided to move in a lengthwise direction rearwards from a closed position in which it adjoins a fixed vehicle front cross member into an intermediate position in which the canvas top is partially opened, each side roof rod being divided into a front roof rod and a rear roof rod which, in the closed position of the canvas top, are rigidly coupled to form an essentially rigid top frame which is coupled to the cross member, and which, in fully open, storage position of the canvas top, are released from the rigid coupling and are stored in a compact arrangement,
    wherein each rear roof rod is pivotally mounted on the body via a four-bar arrangement which contains a main column and a main connecting rod.

14. Folding roof as claimed in claim 13, wherein the four-bar arrangement is coupled via a connecting rod means to the front roof rod in a manner pivoting in the front roof rod during lowering of the canvas top into the lowered.

15. Folding roof as claimed in claim 14, wherein a connecting rod of the connecting rod means is pivotally coupled at one end to a projection of the main connecting rod and is coupled at an opposite end to one of the front roof rod and an auxiliary rod arrangement which is connected therebetween.

16. Folding roof as claimed in claim 14, wherein pivoting of one of the front roof rods by the connecting rod means is staggered in time relative to pivoting of the other of the front roof rods.

17. Folding roof as claimed in claim 14, wherein the connecting rod means pivots the front roof rod at varying speed.

18. Folding roof as claimed in claim 14, wherein the connecting rod means is in driven connection with the main column.

19. Folding roof as claimed in claim 18, wherein stops are provided for limiting movement of the connecting rod means.

20. Folding roof as claimed in claim 18, wherein the pivot joints of each front roof rod have a vertical pivot axis which are located on bilateral side parts of a roof cassette and are offset relative to one another with respect to the lengthwise direction.

21. Folding roof as claimed in claim 14, wherein lock means is provided for coupling the connecting rod means to one of the main column and the main connecting rod over a defined pivot path of said one of the main column and the main connecting rod.

22. Folding roof as claimed in claim 21, wherein the connecting rod means has a ring which is pivotally mounted concentrically relative to one of a pivot bearing axis of the main column and a pivot joint of the main connecting rod and next to the main column or the main connecting rod, respectively and which is drive-coupled to the roof rod via a lever arm, intermediate rods and joints of the connecting rod means.

23. Folding roof as claimed in claim 22, wherein the lock means has a lock pin which is supported to move axially in said ring and is displaceable into coupling engagement with the main column or the main connecting rod when the main column or the main connecting rod is a predetermined position relative to a roof cassette side part.

24. Folding roof for a convertible, comprising:

a front bow;

a canvas top which is attached to the front bow;

a top mechanism having a side roof rod on each lateral side of the folding roof for opening the folding roof by moving the canvas top and front bow into a rear lowered position;

guides on each side roof rod along which the front bow is guided to move in a lengthwise direction rearwards from a closed position in which it adjoins a fixed vehicle front cross member into an intermediate position in which the canvas top is partially opened, each side roof rod being divided into a front roof rod and a rear roof rod which, in the closed position of the canvas top, are rigidly coupled to form an essentially rigid top frame which is coupled to the cross member, and which, in fully open, storage position of the canvas top, are released from the rigid coupling and are stored in a compact arrangement, wherein the front bow is movably supported on said guides on the guides of at least one of the front and rear roof rods, the front bow being movable from the closed position into the intermediate position with the front roof rods coupled to the cross member.

25. Folding roof for a convertible, comprising:

a front bow;

a canvas top which is attached to the front bow;

a top mechanism having a side roof rod on each lateral side of the folding roof for opening the folding roof by moving the canvas top and front bow into a rear lowered position;

guides on each side roof rod along which the front bow is guided to move in a lengthwise direction rearwards from a closed position in which it adjoins a fixed vehicle front cross member into an intermediate position in which the canvas top is partially opened, each side roof rod being divided into a front roof rod and a rear roof rod which, in the closed position of the canvas top, are rigidly coupled to form an essentially rigid top frame which is coupled to the cross member, and which, in fully open, storage position of the canvas top, are released from the rigid coupling and are stored in a compact arrangement, wherein a drive is provided for pivoting the front roof rods.

* * * * *